United States Patent [19]

Mikada

[11] Patent Number: 5,341,221
[45] Date of Patent: Aug. 23, 1994

[54] FACSIMILE APPARATUS

[75] Inventor: Hiroyuki Mikada, Yokohama, Japan

[73] Assignee: Canon Kabushiki Kaisha, Tokyo, Japan

[21] Appl. No.: 709,823

[22] Filed: Jun. 4, 1991

[30] Foreign Application Priority Data

Jun. 5, 1990 [JP] Japan .................. 2-145467

[51] Int. Cl.$^5$ ................................. H04N 1/00
[52] U.S. Cl. ................................. 358/400
[58] Field of Search ............... 358/400, 401, 405, 406, 358/407, 409, 411, 442, 426, 427, 434, 435, 436, 438, 439, 445; 379/100

[56] References Cited

U.S. PATENT DOCUMENTS

| | | | |
|---|---|---|---|
| 4,772,955 | 9/1988 | Kurahayashi et al. | 358/257 |
| 4,796,092 | 1/1989 | Ogata | 358/261.1 |
| 4,814,890 | 3/1989 | Kato | 358/280 |
| 4,827,349 | 5/1989 | Ogata et al. | 358/256 |
| 4,829,385 | 5/1989 | Takezawa | 358/260 |
| 4,845,569 | 7/1989 | Kurahayashi et al. | 358/400 |
| 4,876,604 | 10/1989 | Nobuta | 358/400 |
| 4,922,349 | 5/1990 | Abe et al. | 358/443 |
| 4,970,603 | 11/1990 | Kanai | 358/400 |
| 4,974,097 | 11/1990 | Kaneko et al. | 358/400 |
| 5,041,915 | 8/1991 | Hirota et al. | 358/400 |
| 5,146,352 | 9/1992 | Nannichi | 358/401 |

*Primary Examiner*—Edward L. Coles, Sr.
*Assistant Examiner*—Jerome Grant, II
*Attorney, Agent, or Firm*—Fitzpatrick, Cella, Harper & Scinto

[57] ABSTRACT

A facsimile apparatus for transmitting an image of an original. Image data is obtained by reading the original image and is stored. The resolution of the stored image data is converted into a desired resolution according to a nominal resolution of the apparatus based on a predetermined facsimile procedure, and the image data having the converted resolution is transmitted.

22 Claims, 14 Drawing Sheets

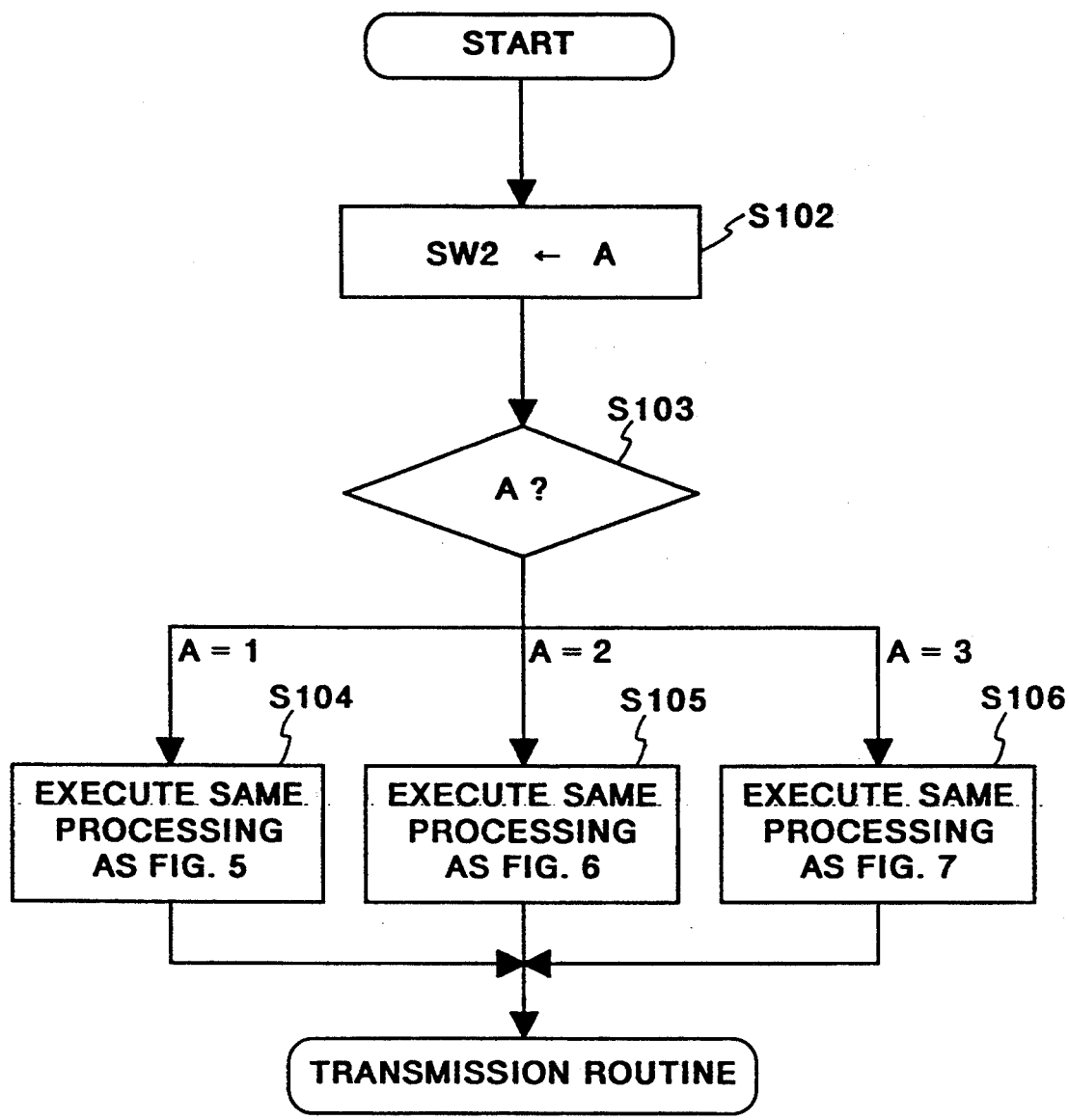
F I G. 10

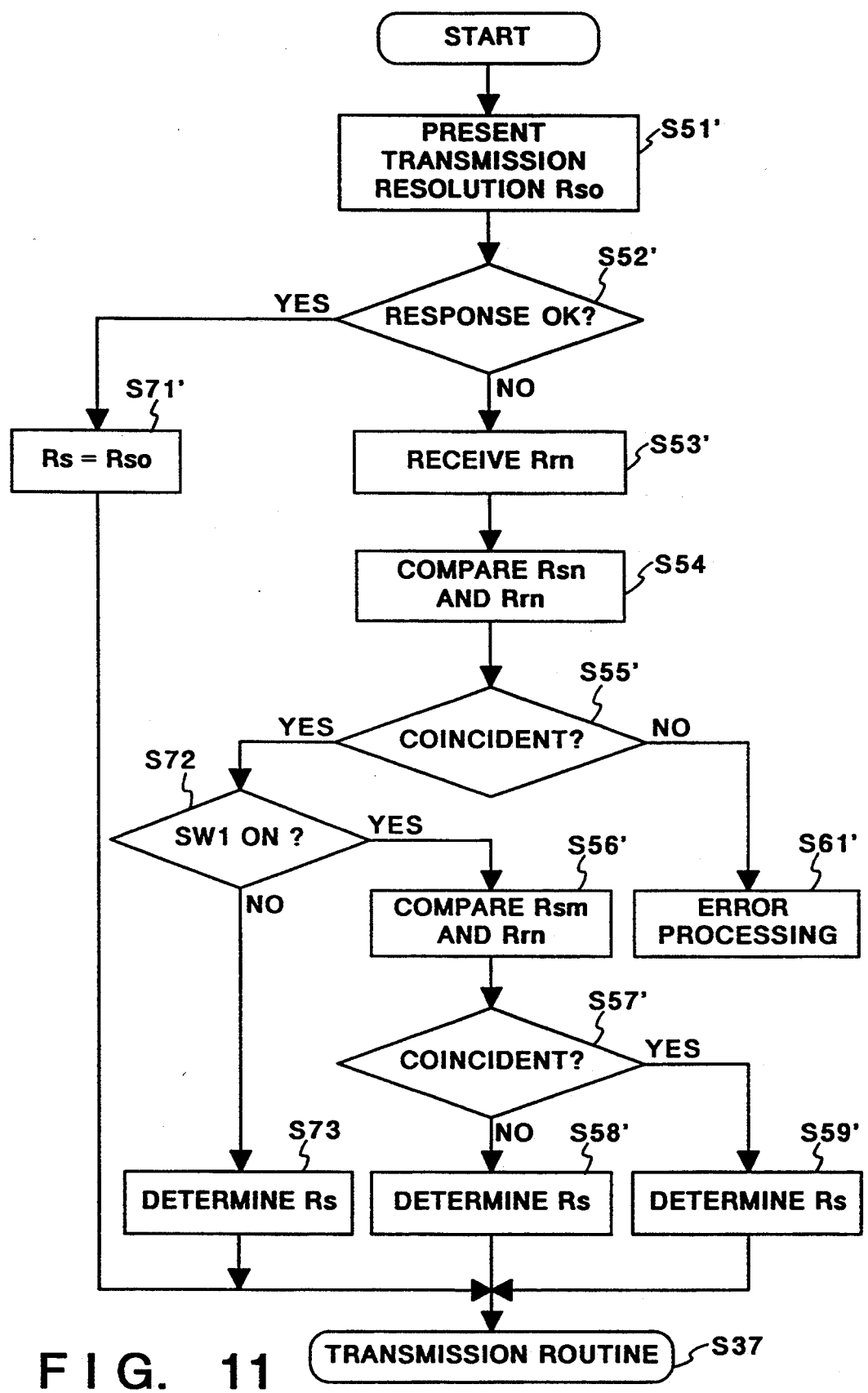
F I G. 11

FACSIMILE APPARATUS

BACKGROUND OF THE INVENTION

1. Field of the Invention

This invention relates to a facsimile apparatus having a function of converting the reading resolution if necessary to transmit data at an optimum resolution.

2. Description of the Related Art

Transmission resolution is included in the parameters which are to be determined in advance by the operator for facsimile transmission using this kind of apparatus.

For example, in a case where an original is read before calling to enable transmission from a memory, it is read while the resolution of the receiver on the other end of the line is unknown; it is ordinarily read at a resolution suitably determined by the operator and is stored in the memory. The resolution is selected by the operator according to the contents of the original to be transmitted. Ordinarily, a high resolution is selected if the contents of the original include small characters and fine drawings, or a low resolution or a low-transmission-cost mode is selected if the contents consist of comparatively large characters.

However, there is a possibility of inconformity of the resolution selected on the transmiting side with the receiving resolution of the receiver on the other end. Actually, in such a case, communication is effected at a standard resolution provided in any facsimile apparatus. The standard resolution is defined as a main scanning-×sub-scanning resolution, 200×200 ppi in the case of G4 facsimile (ppi: pels/inch) or 8 pels/mm×3.85 line/mm in the case of G3 facsimile.

In a case where a facsimile apparatus having two transmission resolutions of 400 and 200 ppi is used for transmission and where the receiver has two receiving resolutions of 300 and 200 ppi, the operator may select the transmission resolution of 400 ppi. Under this condition, communication at 200 ppi is performed, which result is contrary to the operator's intention of performing high-resolution communication.

Again, in a case where a facsimile apparatus having two transmission resolutions of 300 and 200 ppi is used for transmission and where the receiver has two receiving resolutions of 400 and 200 ppi, the operator may select the transmission resolution of 300 ppi. Under this condition, communication at 200 ppi is performed, which does not meet the operator's intention of performing high-resolution communication.

Ordinarily, the reader of the facsimile apparatus for reading images is designed so as to read images at the highest transmission resolution of the apparatus. This resolution ordinarily coincides with the recording resolution of the recording unit.

In the above cases, the image read at 400 or 300 ppi is transmitted by converting the resolution into 200 ppi. A similar procedure is also used in the case of multicast communication of image data stored in a memory. That is, suitable resolutions of transmitters for other-side terminals are selected and an image read at a high resolution is converted so that its resolution changes into the selected resolutions. Needless to say, the available resolutions are limited within the range of nominal resolutions of the apparatus on the transmitting side.

Conventionally, such resolution conversion is performed by simple image processing such as thinning of pixels or OR processing. The conventional methods using such techniques entail the problem of deteriorations in image qualities and have considerable drawbacks in terms of practice with respect to half-tone images in particular. In some case, the image qualities of the received image are seriously deteriorated depending upon the combination of the resolutions of the transmitter and the receiver. In the case of a facsimile apparatus having both the functions of group 4 and group 3 apparatuses (hereinafter referred to as "G4 apparatus" and "G3 apparatus", respectively) specified by CCITT (International Consultative Committee for Telephone and Telegraph), a need for converting the resolution from the inch system for G4 apparatuses to the millimeter system for G3 apparatuses arises when, for example, an image read at the G4 reading resolution is transmitted to a G3 apparatus. The same problem as that mentioned above is thereby encountered.

SUMMARY OF THE INVENTION

An object of the present invention is to provide a facsimile apparatus free from the above-described drawback of the conventional apparatuses.

Another object of the present invention is to provide a facsimile apparatus capable of communicating at a resolution closer to the resolution in accordance with the transmission purpose selected by the operator.

Still another object of the present invention is to provide a facsimile apparatus capable of communicating at a resolution selected in consideration of the communication cost.

According to one aspect of the present invention is to provided a facsimile apparatus comprising a memory means for storing image data read from an original to be transmitted, a conversion means for converting the resolution of the image data stored by the memory means into a desired resolution in accordance with the nominal transmission resolutions of the apparatus based on a predetermined transmission procedure, and a transmission means for transmitting the image data of the converted resolution.

Another aspect of the present invention provides a facsimile apparatus comprising a memory means for storing image data read from an original to be transmitted, a conversion means for converting the resolution of the image data stored by the memory means into a resolution higher than the nominal transmission resolutions of the apparatus based on a predetermined transmission procedure, and a transmission means for transmitting the image data of the converted resolution.

A still further aspect of the present invention provides a facsimile apparatus comprising a memory means for storing image data read from an original to be transmitted, a conversion means for converting the resolution of the image data stored by the memory means into a resolution lower than the nominal transmission resolutions of the apparatus based on a predetermined transmission procedure, and a transmission means for transmitting the image data of the converted resolution.

A still further aspect of the present invention provides a facsimile apparatus comprising a memory means for storing image data read from an original to be transmitted, a conversion means for converting the resolution of the image data stored by the memory means into a plurality of resolutions including the nominal transmission resolutions of the apparatus based on a predetermined transmission procedure, and a transmission means for transmitting the image data of the converted resolution.

A still further aspect of the present invention provides a facsimile apparatus comprising a memory means for storing image data read from an original to be transmitted, a first collation means for collating a plurality of different nominal transmission resolutions of the apparatus with a plurality of different nominal transmission destination resolutions, a second collation means for collating a plurality of different non-nominal transmission resolutions of the apparatus with the nominal transmission destination resolutions, only when a match occurs in the collation performed by the first collation means, a conversion means for converting the resolution of the image data stored by the memory means into one of the nominal transmission resolutions found as a matching resolution by the first collation means or the second collation means, and a transmission means for transmitting the image data of the converted resolution.

Other objects and features of the present invention will become more fully apparent from the following description of the preferred embodiments, taken in conjunction with the accompanying drawings.

BRIEF DESCRIPTION OF THE DRAWINGS

FIG. 10 is a flow chart of the method of determining the final transmission resolution in accordance with a fifth modification of the first embodiment;

FIG. 11 is a flow chart of a pre-procedure routine of a second embodiment;

DESCRIPTION OF THE PREFERRED EMBODIMENTS

The preferred embodiments of the present invention will be described below in detail with reference to the accompanying drawings.

FIRST EMBODIMENT

Figure 1:
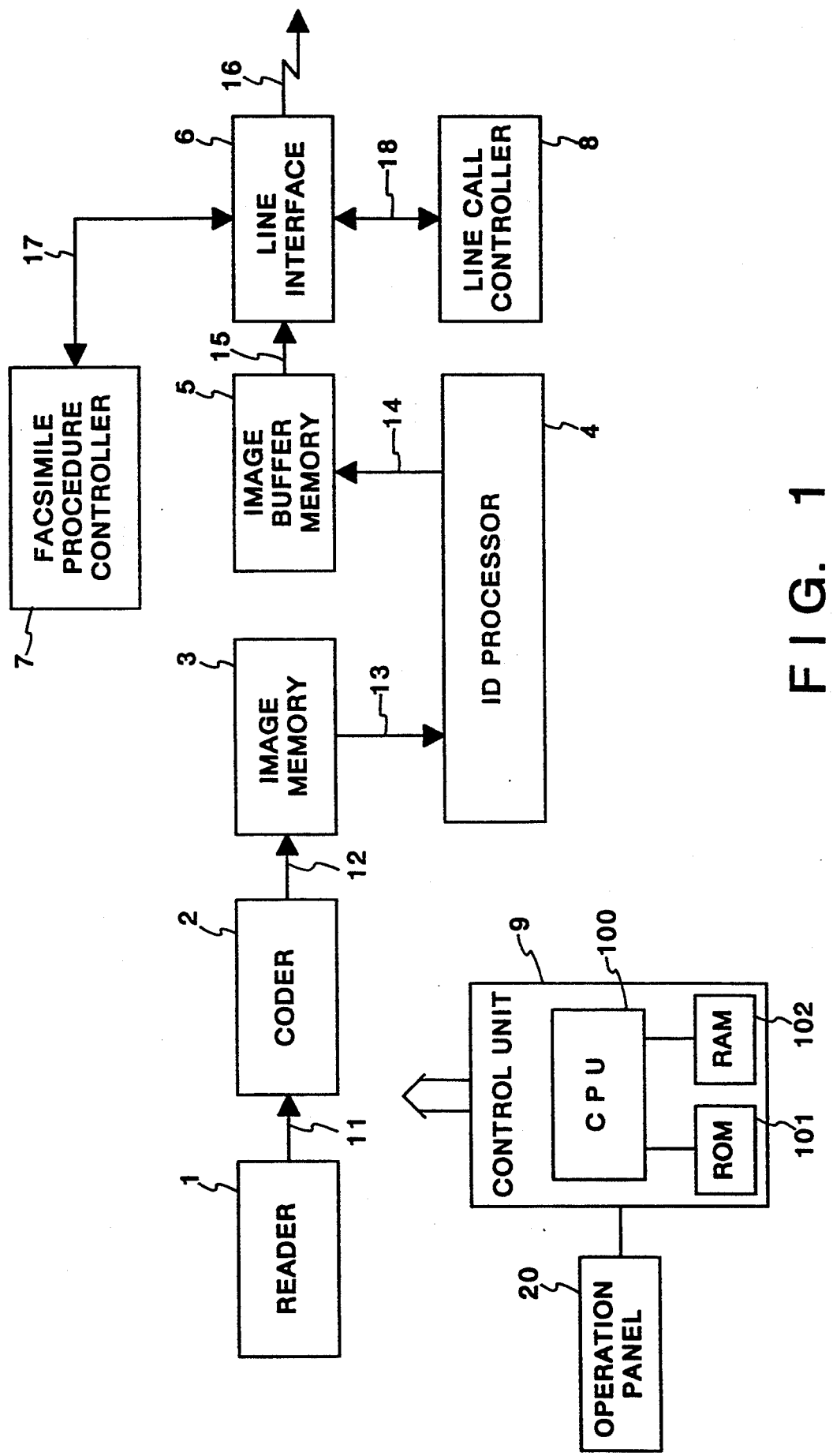
FIG. 1 is a block diagram of the construction of a facsimile apparatus in accordance with a first embodiment of the present invention.

FIG. 1 is a block diagram of the construction of a facsimile apparatus in accordance with a first embodiment of the present invention. A reader 1 reads an original to be transmitted by scanning the same and converts read data into an electrical signal 11. A coder 2 encodes the electrical signal 11 by a predetermined method. An image memory 3 stores encoded image data 13 with respect to a page, or an entire document, as the unit. An image density (ID) processor 4 is supplied with image data 13 read from the image memory 3 and converts the resolution of this image data into a resolution or a pixel density at which the image is actually transmitted. An image buffer memory 5 buffers the data speed between the ID processor 4 and a line interface 6 which connects a line 16 and the internal section of the apparatus and which interfaces with the line 16 with respect to the operations of line calling, facsimile procedure control and image transfer. A facsimile procedure controller 7 controls the facsimile procedure including a session procedure executed for facsimile end-to-end communication. A line call controller 8 controls the operation of calling through the line 16. Controls signals are transmitted between the facsimile procedure controller 7 and the line call controller 8, as indicated at 17 and 18. Image data is transmitted between the ID processor 4 and the image buffer memory 5 and between the image buffer memory 5 and the line interface 6 as indicated at 14 and 15.

A control unit 9 controls the whole of the apparatus and has a CPU 100 which operates by using a work area of a RAM 102 in accordance with programs stored in a ROM 101. Programs corresponding to the flow charts of FIGS. 3 to 12 are stored in the ROM 101. An operation panel 20 is provided with a key cluster including keys for designating facsimile functions and keys for inputting destinations, and a liquid crystal display for displaying simple data on a menu, the state of communication and so on.

Figure 2:
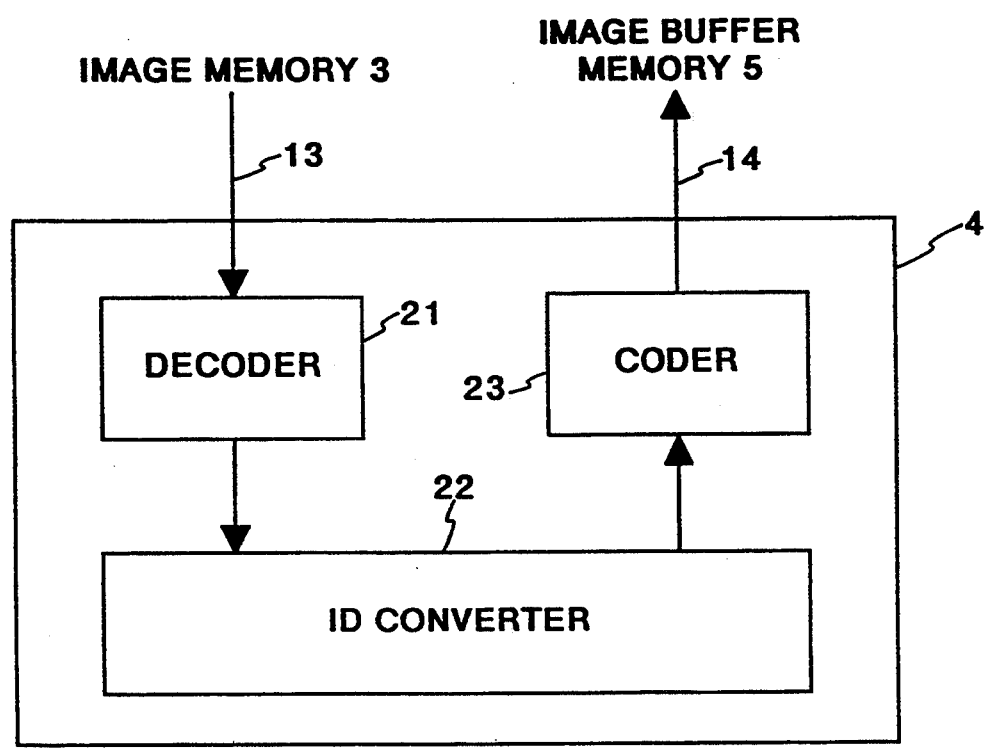
FIG. 2 is a block diagram of an example of the construction of the ID processor 4 of the first embodiment.

FIG. 2 is a block diagram of an example of the construction of the ID processor 4. A decoder 21 decodes MMR image data stored in the image memory 3. An ID converter 22 processes the image data decoded and restored to the original data with respect to the pixel density. A coder 23 encodes the output from the converter 22 again.

Figure 13:
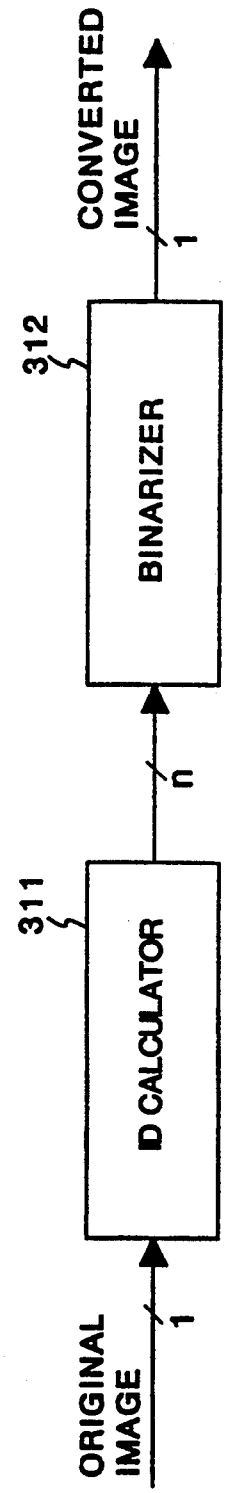
FIG. 13 is a block diagram of the ID converter 22 of the first embodiment.

FIG. 13 is a block diagram of the ID converter 22 in accordance with the first embodiment. The density of pixels converted from those of the original image by a projection method is calculated by an ID calculator 311, and the result (n bits) of this calculation is changed into binary data by a binarizer 312 based on an error diffusion method, thereby obtaining a converted output image having a converted pixel density.

Figure 14:
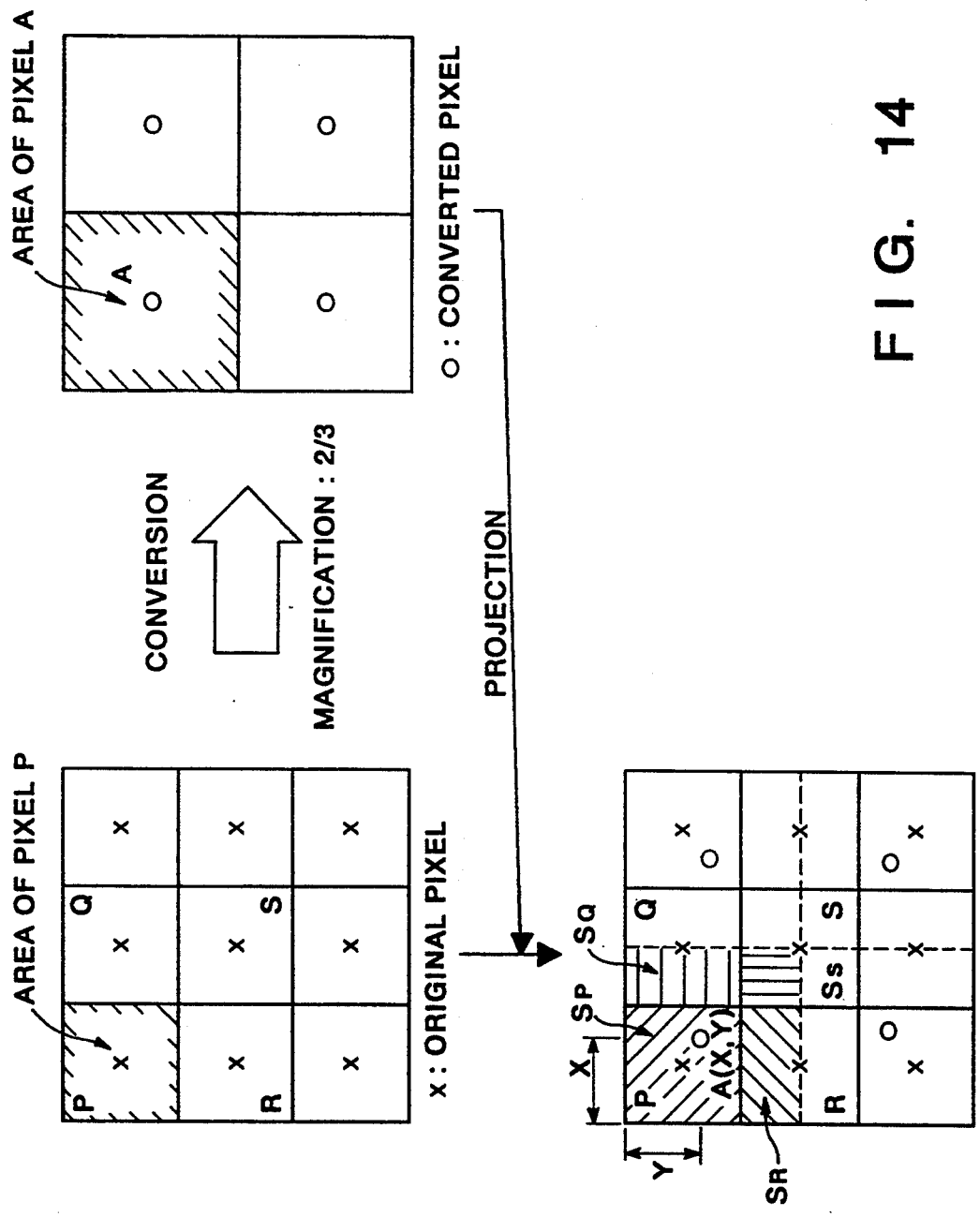
FIG. 14 is a diagram of the principle of pixel density conversion based on a projection method.

First, the principle of calculation of the pixel density based on a projection method will be described below with reference to FIG. 14. A conversion magnification of, for example, ⅔ is used in the following description. A converted pixel A, which is an observed pixel, is projected on the original image, original pixels overlapping the pixel area of the converted pixel A on the projection plane are set as P, Q, R, and S, and the areas occupied by the pixels P, Q, R, and S within the area of the converted pixel A are set as $S_P$, $S_Q$, $S_R$, and $S_S$, respectively. The average density $I_A$ of the observed pixel A is then expressed by the following equation:

$$I_A = \frac{S_P \times I_P + S_Q \times I_Q + S_R \times I_R + S_S \times I_S}{S_P + S_Q + S_R + S_S} \quad (1)$$

($I_P$, $I_Q$, $I_R$, $I_S$: the densities of the image areas P, Q, R, and S)

Next, the average density $I_A$ of the observed pixel A is changed into binary data to obtain a converted output pixel having a converted pixel density.

Figure 15:
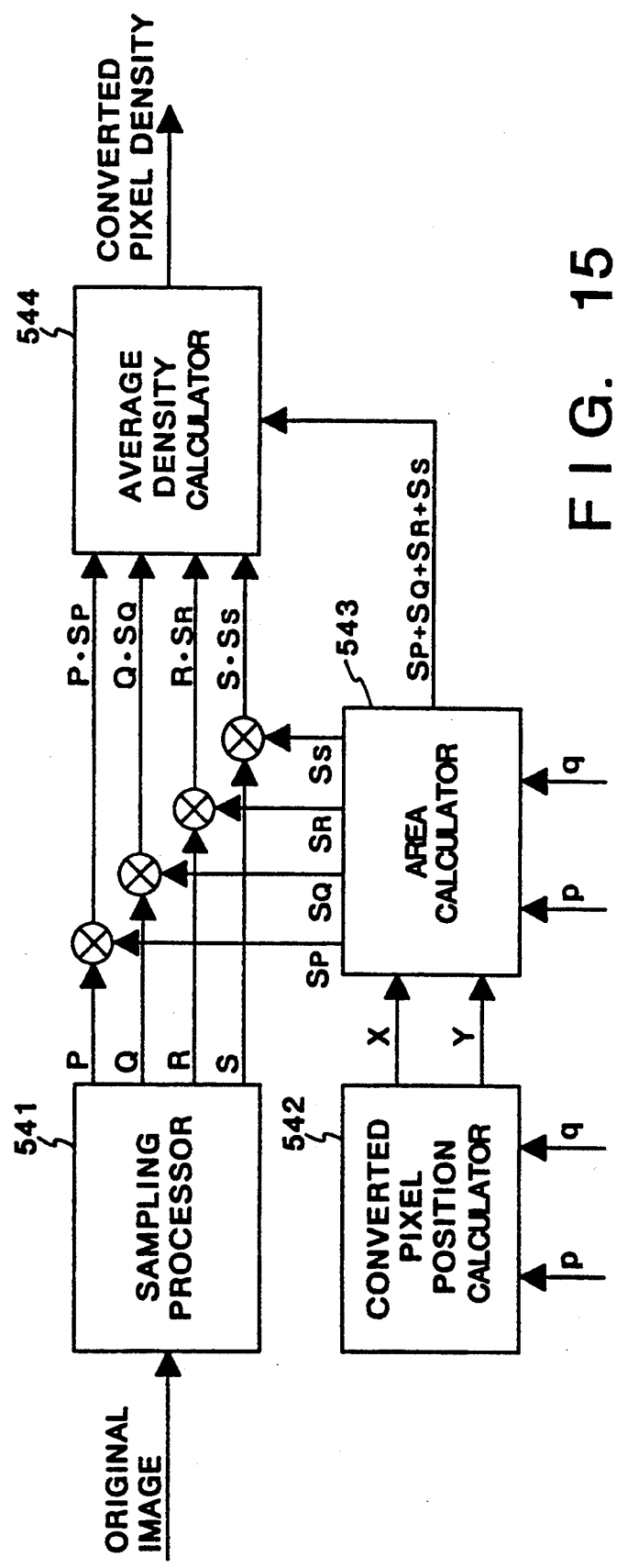
FIG. 15 is a diagram of an example of the ID calculator based on the projection method.

FIG. 15 shows blocks of the ID calculator 311. In the illustrated example, the processable range is determined by a conversion magnification > about ½. A pixel sampling processor 541 picks up original pixels in the vicinity of the position (X, Y) of the converted image on the projection plane. A converted pixel position calculator 542 calculates the position of the converted pixel on the projection plane determined according to the conversion magnifications in the main and sub scanning directions. An area calculator 543 calculates the areas according to the position information obtained by the position calculator 542 and the conversion magnification. A calculator 544 for calculation of equation (1) calculates the average density of the observed converted pixel from the result of multiplication, i.e., the outputs from the pixel sampling processor 541 and the area calculator 543.

The construction of the ID calculator 311 is not limited to this and may be arranged in accordance with any processing method so long as the result of calculation generally expressed by equation (2) is obtained. That is, $$I_N = \frac{\Sigma\{I_K \times S_K\}}{\Sigma S_K} \quad (2)$$

where $I_N$ represents the average density or average luminance of an observed converted pixel N, $I_K$ represents the density or luminance of original pixels K overlapping the observed converted pixel N on the projection plane, and $S_K$ represents the area of the overlapping portions of the original pixel K located in the area of the converted pixel N.

In the first embodiment, the number of original pixels K to be referred to is limited to 4 for simplification of the circuit. It is possible to extend the range of processable conversion magnification (minimum magnification when the image is reduced in size) by increasing the number of reference pixels. The same effect can also be obtained by sequential processing of image data supplied in sequence in accordance with the arrangement of the image sampling processor 541 or by processing image data stored in a memory or the like.

Next, the operation of the binary converter 312 based on an error diffusion method will be described below. If the projection method is applied to a pseudo half tone image such as dither and if the result of calculation is simply changed into binary data (i.e., two-valued with respect to a constant threshold value), moiré or periodic lines become stronger due to a quantization error or the like, resulting in a deterioration in image qualities. In the first embodiment, to prevent such a deterioration in image qualities due a quantization error, binary encoding is effected based on an error diffusion method.

Figure 16:
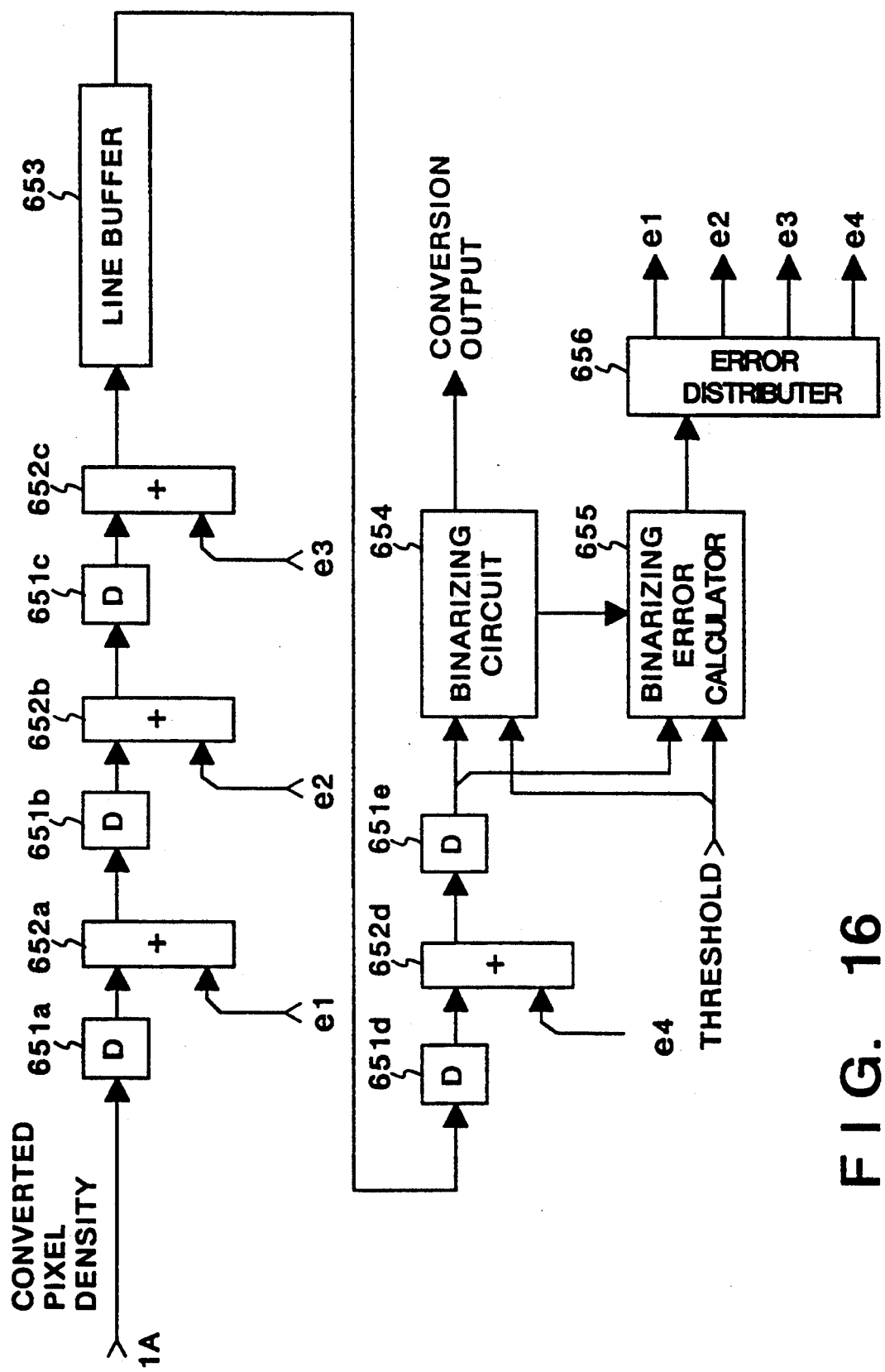
FIG. 16 is a diagram of an example of a binarizer for an error diffusion processing.

FIG. 16 shows blocks of the binarizer 312. When the pixel density calculated by the ID calculator 311 based on the projection method and output from the ID calculator 311 is supplied through one-pixel delay elements 651a to 651e, a delay element 653 for a delay three pixels smaller than one line and adders 652a to 652d, binary encoding errors $e_1$ to $e_4$ which have previously occurred with respect to the peripheral pixels are added to the image density. The density value including these binary encoding errors of the peripheral pixels is two-valued by the binarizing circuit 654 with respect to a constant threshold value. The binary data is thereby obtained as a conversion output. A quantization error caused by this binary encoding is obtained by a binarizing error calculator 655 and is distributed to $e_1$ to $e_4$ by an error distributor 656.

In the binarizing error calculator 655, if the binarizing error is E; the density supplied to the binarizing circuit is ID (obtained by normalizing the maximum to 1); the threshold value is T; and the binary output is "1" or "0", the following calculation is performed:

$$E = \begin{bmatrix} I_{D-1} & (I_D > T) \\ I_D & (I_D \leq T) \end{bmatrix}$$

Figure 17:
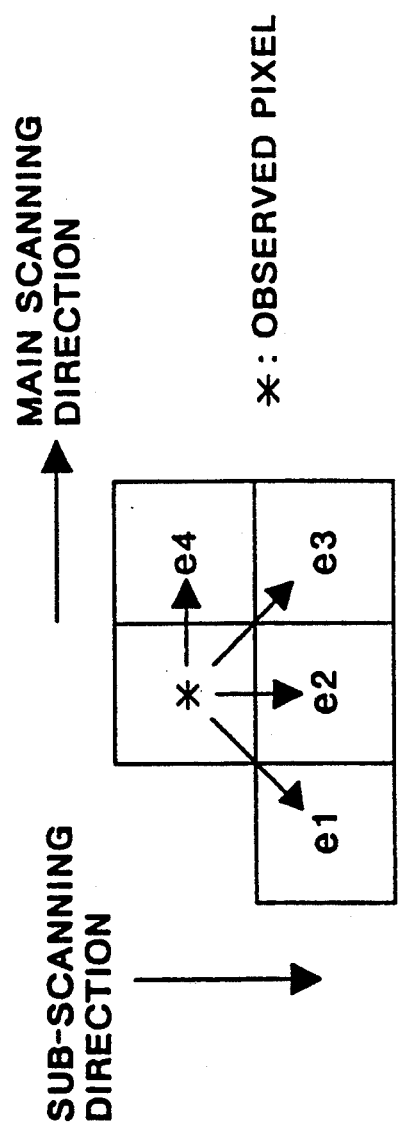
FIG. 17 is a diagram of the error diffusion method.

In the error distributor 656, $e_1$ to $e_4$ are calculated by, for example, the following equations:

$$e_1 = \frac{1}{6} E, \ e_2 = \frac{2}{6} E, \ e_3 = \frac{1}{6} E, \ e_4 = \frac{2}{6} E$$

and $e_1$ to $e_4$ are distributed to the pixels on the periphery of the observed pixel, as shown in FIG. 17.

In the example shown in FIG. 16, the error is diffused to the peripheral four pixels, but this is not exclusive. The error distribution may be determined in consideration of the image qualities and the circuit scale. However, to suitably eliminate moiré, it is necessary to diffuse 100% of the binarizing error to the periphery. That is, $e_n$ is determined so that $\Sigma e_n = E$ (n: the number of peripheral pixels to which the error is distributed) is satisfied.

The same effect can be obtained by using an average error minimizing method instead of the error diffusion method.

Thus, the average density or average luminance of the converted pixel obtained by the projection method is changed into binary data. It is thereby possible to convert the image density of indefinite pseudo-half-tone-processed images at arbitrary magnifications by the same processing while limiting influences upon characters, diagrams and the like mixed in the images. It is also possible to effect pixel density conversion without any considerable deterioration in image qualities.

Figure 3:
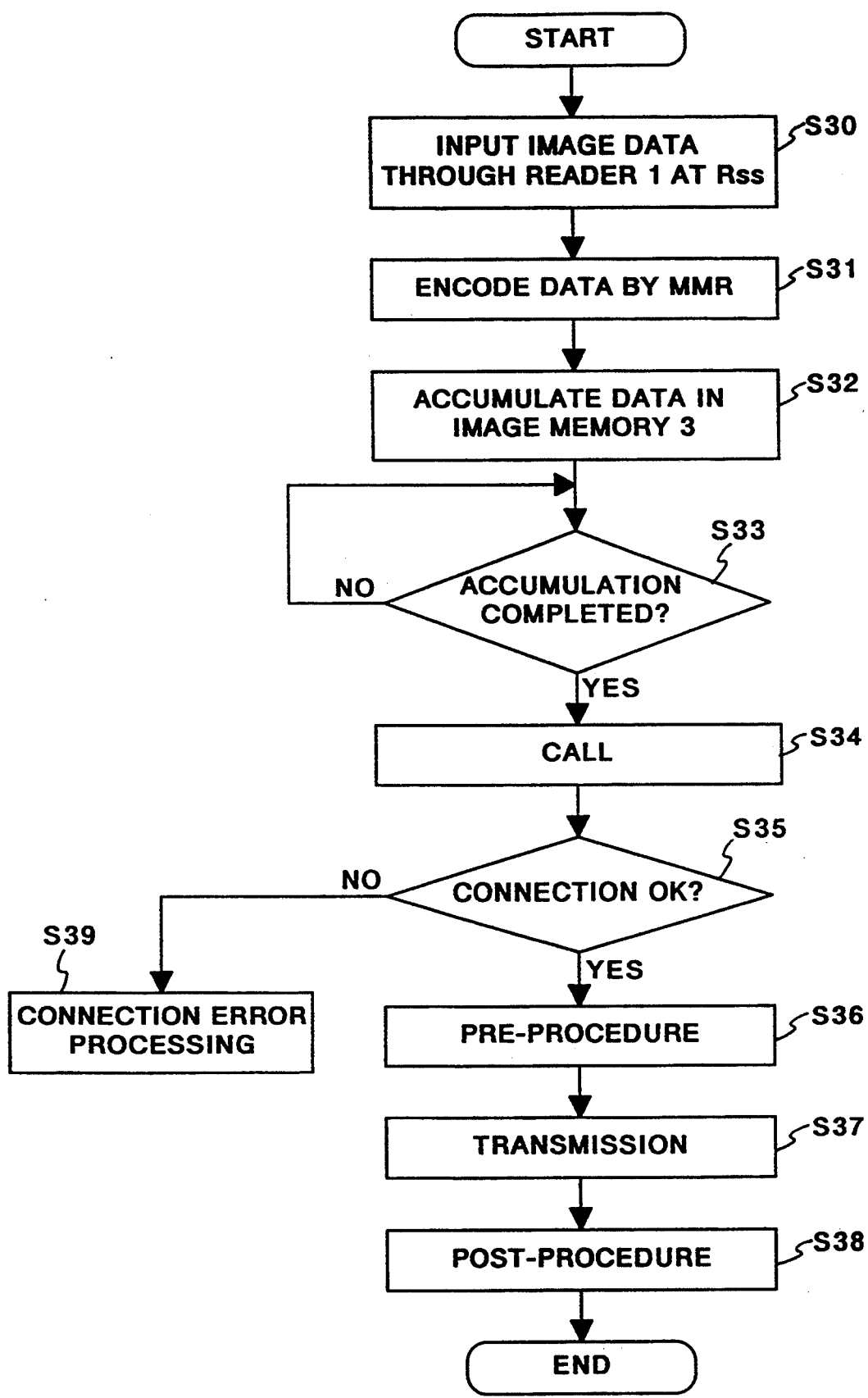
FIG. 3 is a flow chart of the transmission operation of the first embodiment.

FIG. 3 is a flow chart of the transmitting operation of the first embodiment. The operation of the apparatus shown in FIG. 1 will be described below with reference to FIG. 1.

It is assumed that the apparatus is a G4 apparatus and that the reader 1 has a reading resolution Rss of 300 ppi while nominal transmission resolutions Rsn of 300 and 200 ppi are provided.

First, the operator sets a transmission mode on the operation panel 20.

In this case, it is assumed that the operator wishes to transmit the original at a high resolution of 300 ppi. AS indicated in the flow chart shown in FIG. 3, the reader 1 inputs data on the original image at the resolution Rss of 300 ppi by the instruction of the operator (step S30). The coder 2 encodes the read image data by the MMR (Modified Modified Read) method which is the encoding method for the G4 apparatus (step S31). The image data thereby encoded is accumulated in the image memory 3 with respect to a document unit (step S32). The amount of data can be reduced by using the coder 2 in this manner. It is thereby possible to increase the number of original sheets whose data can be accumulated in the image memory 3.

Next, determination is made as to whether or not data accumulation for one original document to be transmitted has been completed (step S33). If YES, the process proceeds to a call routine of step S34. The step S34 represents a call routine, more specifically, a line connection operation for sending the address number of the receiver set by the operator to the line 16 through the line interface 6 under the control of the line call controller 8. The process then proceeds to a determination routine for determining whether or not the line connection operation is completed so that the apparatus is ready for being connected to the receiver on the other end of the line (step S35). If it is determined that the connection is established, a pre-procedure routine (step S36) is conducted. In the case of a connection failure, a connection error processing routine (step S39) is conducted.

In the pre-procedure routine of step S36, various conditions for communication between the apparatus on this side and the unillustrated receiving apparatus are determined through execution of the facsimile procedure using the facsimile procedure controller 7. The resolution condition is mainly discussed in this description, and details of it will be described later with reference to FIG. 4.

Next, a transmission routine is conducted (in step S37) to transmit the image under the conditions determined by the pre-procedure (step S36). When transmission is started, the image date stored in the image memory 3 is sent to the line 16 via the ID processor 4, the image buffer memory 5 and the line interface 6.

In the ID processor 4, the density of 300 ppi of the image data is converted into a transmission resolution (e.g., 400 ppi) finally determined by the pre-procedure (step 36) described later, and the image data processed is output to the image buffer memory 5. This processing is as described below with reference to the example shown in FIG. 2. The encoded image data stored in the image memory 3 is decoded by the decoder 21 and is input into the ID converter 22 to undergo pixel density conversion processing (from 300 to 400 ppi). The date thereby processed is MMR-encoded again by the coder 23, and is thereafter sent to the line 16 via the image buffer memory 5 and the line interface 6.

After the completion of image transmission of one document in accordance with the transmission routine of step S37, a post-procedure routine (step S38) is conducted as between the facsimile procedure controller 7 and the receiving apparatus, thereby completing the main transmission operation.

Figure 4:
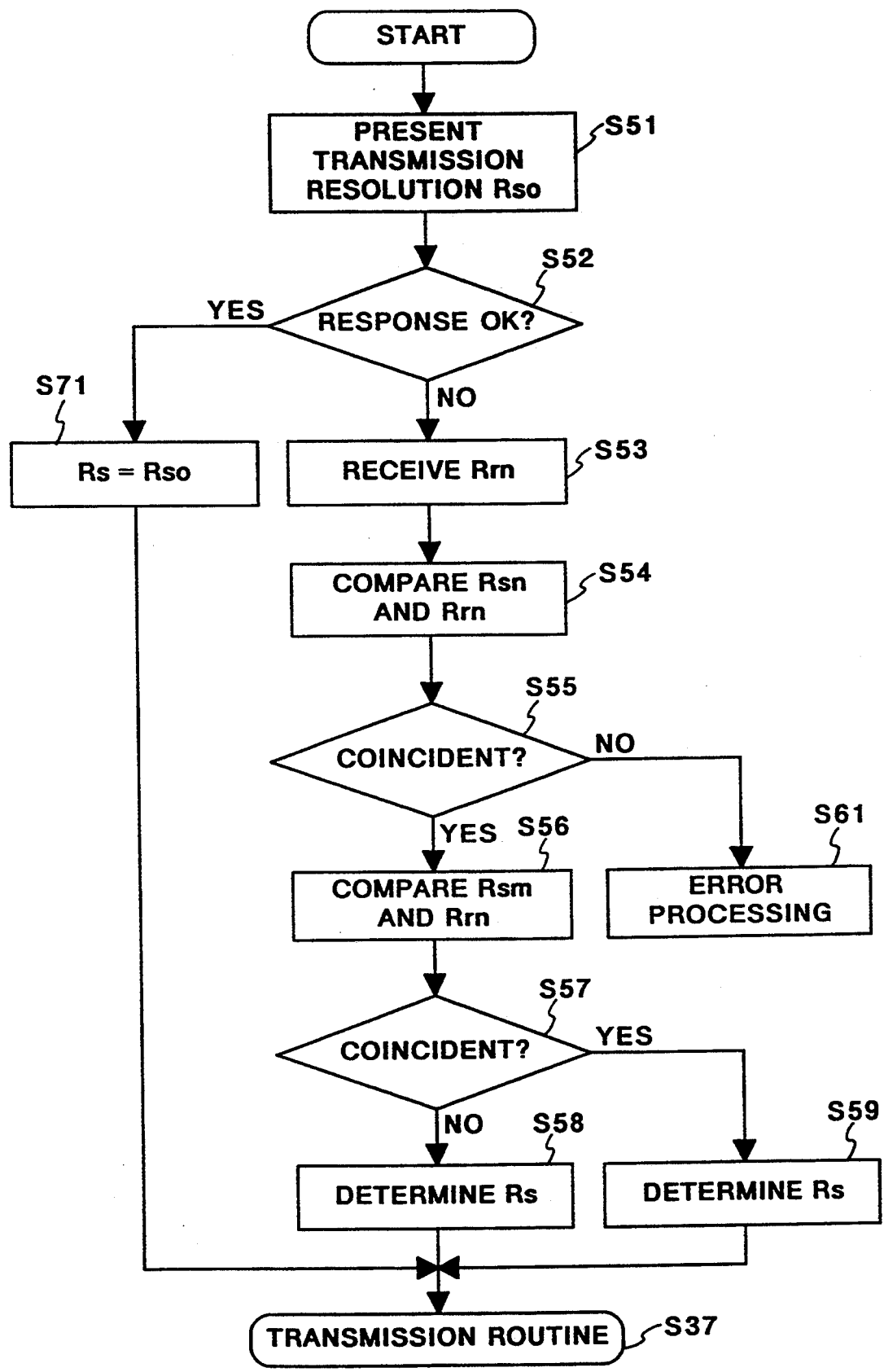
FIG. 4 is a flow chart of an example of a pre-procedure routine of the first embodiment.

FIG. 4 is a flow chart of an example of the pre-procedure routine of the first embodiment. This pre-procedure routine corresponds to step S36.

As mentioned above, the apparatus first presents the receiving apparatus with the resolution of 300 ppi selected for transmission. This presented transmission resolution is set as Rso.

First, Rso=300 ppi is presented (step S51). The process then proceeds to a routine (step S52) for determining the response from the receiving apparatus. If the receiving apparatus is capable of receiving at 300 ppi and accepts the presentation, the response from the receiving apparatus indicates that transmission at the presented resolution is possible, the final transmission resolution Rs finally determined is set as Rs=Rso=300 ppi in step S71, and transmission at 3300 ppi is executed by the succeeding transmission routine (step S37).

If the receiver is incapable of receiving at 300 ppi as in this embodiment, the nominal receiving resolution represented by Rrn is sent from the receiving apparatus. The next step S53 represents a routine of processing for receiving this nominal receiving resolution Rrn. In this description, it is assumed that two nominal receiving resolutions Rrn of 400 and 200 ppi are provided in the receiving apparatus.

The nominal transmission resolutions Rsn of the transmitter and the nominal receiving resolutions Rrn of the receiver are compared (step S54). Since in this case Rsn=300, 200 (ppi) and Rrn=400, 200 (ppi), a match occurs with respect to 200 ppi. Accordingly, the result of determination of step S55 which represents a discrimination routine is "matching", i.e., YES, and the process proceeds to step S56. If there is no matching resolution, the result of determination is "mismatching" and the process proceeds to step S61 to perform error processing.

In step S56, non-nominal transmission resolutions Rsm and the nominal receiving resolutions Rrn of the receiver are compared in the transmitter. Non-nominal transmission resolutions Rsm are transmission resolutions which are not particularly specified but which may be used as quasi-nominal resolutions at which data can be transmitted without any considerable deterioration in image qualities. For example, 240 and 400 ppi may be used as non-nominal transmission resolutions Rsm.

In the first embodiment, if Rsm=240, 400 ppi, these resolutions are compared with the nominal receiving resolutions Rrn, and a match with respect to 400 ppi is recognized. The process thereby proceeds to step S59 which represents a routine for determining the final transmission resolution Rs. In the first embodiment, the final transmission resolution Rs is determined from two resolutions of 200 and 400 ppi with predetermined selection criteria. An algorithm for determining the resolution will be described later with reference to FIG. 5. Only a case of selecting 400 ppi is discussed here.

If Rsm is 240 ppi alone, there is no matching resolution and the process therefore proceeds to step S58 which represents another routine for determining the final transmission resolution Rs. In this case, 200 ppi found as a matching resolution in step S55 is determined as the final transmission resolution Rs. Thus, in a case where a facsimile apparatus having nominal transmission resolutions Rrn of 300 and 200 ppi is operated to transmit at the higher resolution of 300 ppi, and where the receiving apparatus is not capable of receiving at 300 ppi, transmission at 400 ppi is enabled unlike the conventional apparatus in which the standard resolution of 200 ppi is selected for transmission in such a situation, thus achieving high-resolution transmission satisfying the operator's intention.

Another example of processing will be described below in which the transmitter has two nominal transmission resolutions Rsn of 400 and 200 ppi, and one non-nominal transmission resolution Rsm of 300 ppi, and in which the transmitting apparatus is operated to transmit at Rso=400 ppi.

If the receiver has Rrn=300, 200 ppi, 200 ppi coincides with one resolution of the receiver, and, as shown in FIG. 4, the non-nominal transmission resolution Rsm and the nominal receiving resolution Rrn are compared (step S56). In step S57, a match is found with respect to 300 ppi. The process then proceeds to step S59 to select one of 200 and 300 ppi based on the later-described algorithm. This selection is not explained here in detail but Rs=300 ppi is determined, as in the former example.

Thus, in a case where a facsimile apparatus having nominal transmission resolutions of 400 and 200 ppi is operated to transmit at the higher resolution of 400 ppi, and where the receiving apparatus is not capable of receiving at 400 ppi, transmission at 300 ppi is enabled unlike the conventional apparatus in which the standard resolution of 200 ppi is selected for transmission in such a situation, thus achieving high-resolution transmission satisfying the operator's intention.

The embodiment has been described above with respect to a G4 apparatus. In the case of communication using a G3 apparatus or a combination of G4 and G3 apparatuses, however, it is also possible to perform transmission while limiting deterioration in image qualities by using the pixel density conversion function.

In a case where the apparatus of 200 ppi on the transmitting side effects transmission to a terminal such as a CRT monitor which can be sufficiently supplied with data at a low resolution corresponding to a non-standard facsimile resolution, there is a need for conversion to a lower resolution in some case.

The method of determining the final transmission resolution Rs will be described in more detail.

An example of an algorithm for a routine such as step S58 or S59 for determining the final transmission resolution Rs will be described below. $f_K=f_K$ (Rsn, Rrn) is provided; $f_k$ is a resolution at which the nominal transmission resolution Rsn and the nominal receiving resolution Rrn coincide with each other, and $g_L=g_L$ (Rsm, Rrn) is provided; $g_L$ is a resolution at which the non-nominal transmission resolution Rsm and the nominal receiving resolution Rrn coincide with each other, where K=1, 2, ..., L=1, 2..., Rsn is a nominal transmission resolution of the transmitter, Rrn is a nominal receiving resolution of the receiver, and Rsm is a non-nominal transmission resolution of the transmitter.

Figure 5:
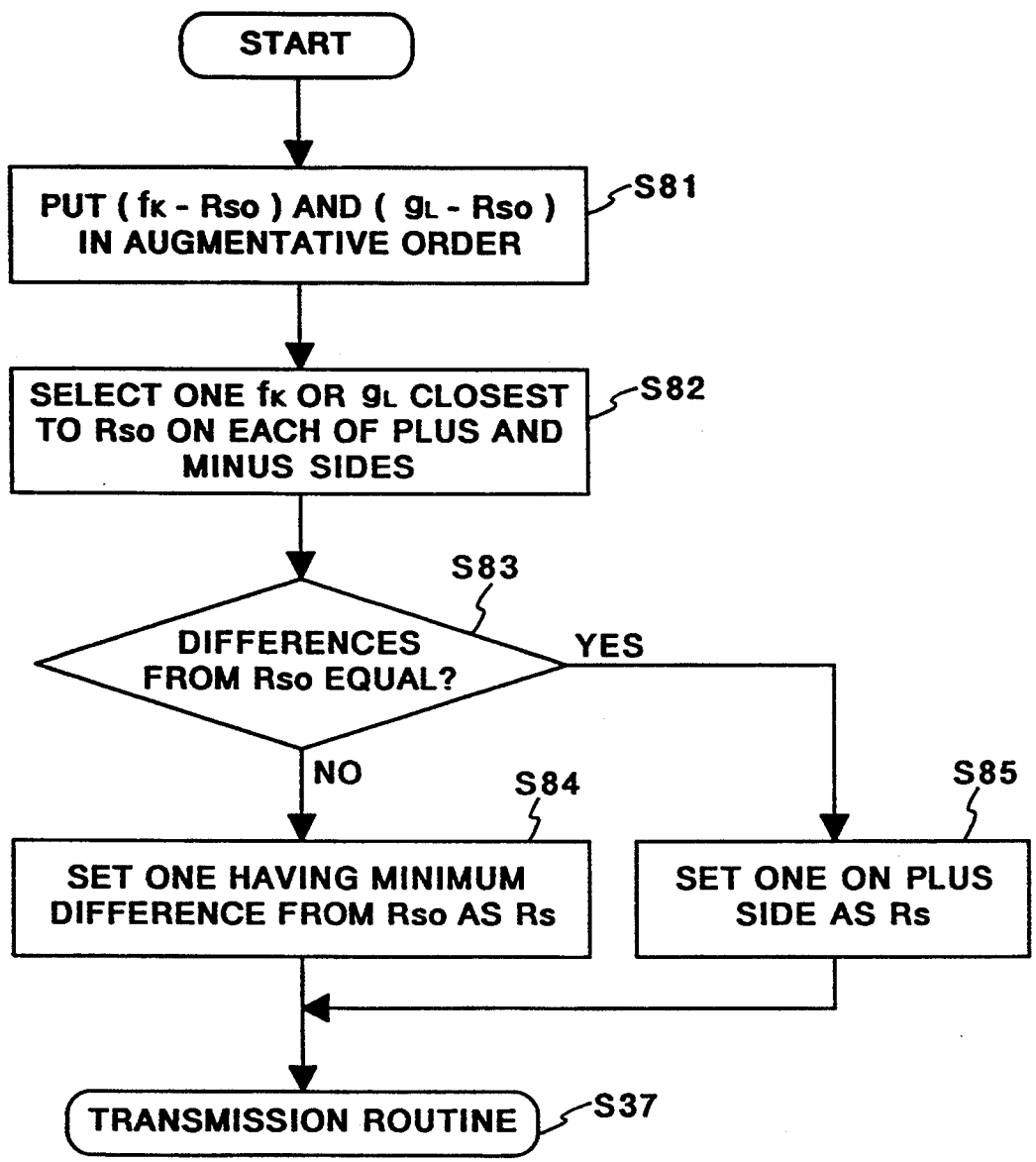
FIG. 5 is a flow chart of the method of determining the final transmission resolution of the first embodiment.

FIG. 5 is a flow chart showing details of the method of determining the final transmission resolution in accordance with the first embodiment.

As shown in FIG. 5, $(f_K-RSo)$ and $(g_L-RSO)$ are first put in augmentative order (step S81). That is, in the routine of step S81, processing is performed whereby the differences between $f_K$ and $g_L$ and the presented transmission resolution Rso first designated by the transmitter are calculated and put in augmentative order.

Next, one value of $f_K$ or $g_L$ corresponding to each of positive and negative ones closest to zero of the values put in augmentative order is selected (step S82). If the differences between the presented transmission resolution Rso and the resolutions selected on the plus and minus sides coincide with other (step S83), the process proceeds to step S85 and the resolution on the plus side is determined as final transmission resolution Rs. If NO in step S83, the process proceeds to step S84, and one of the two resolutions selected in step S82 which is smaller in difference from the presented transmission resolution Rso is determined as final transmission resolution Rs.

If for example Rsn=300, 200 ppi, Rsm=400, 240 ppi, Rrn=400, 200 ppi and Rso=300 ppi as in the above example, $f_K=200$ ppi and $g_L=400$ ppi are obtained. $f_K-300=-100$, $g_L-300=+100$, and the differences from the presented transmission resolution Rso are 100 (absolute value and equal to each other. The resolution on the plus side is therefore adopted, so that Rs=$g_L$=400 ppi.

It is thus possible to select a final transmission resolution corresponding to the minimum difference between the transmission resolution at which the operator wishes to transmit from the transmitter to the receiver and the resolutions at which the receiver can receive. In the first embodiment, the resolution on the plus side is set as the finally determined transmission resolution Rs in step S85. However, needless to say, the resolution on the minus side can alternatively be adopted.

In accordance with the first embodiment, as described above, transmission can be effected at an optimum resolution closer to that selected by the operator according to the transmission purpose. For example, even an facsimile apparatus having a resolution of 300 ppi can transmit to a receiver of 400 ppi, and it is possible to reduce the manufacture cost and the physical size of the optical system and the capacity of the image memory in comparison with an apparatus of 400 ppi.

Modifications of the above-described method of determining the transmission resolution will be described below. In the following description, examples of algorisms for routines for determining the final transmission resolution Rs like steps S58 and S59 of the flow chart shown in FIG. 4 are also explained.

FIRST MODIFICATION

Figure 6:
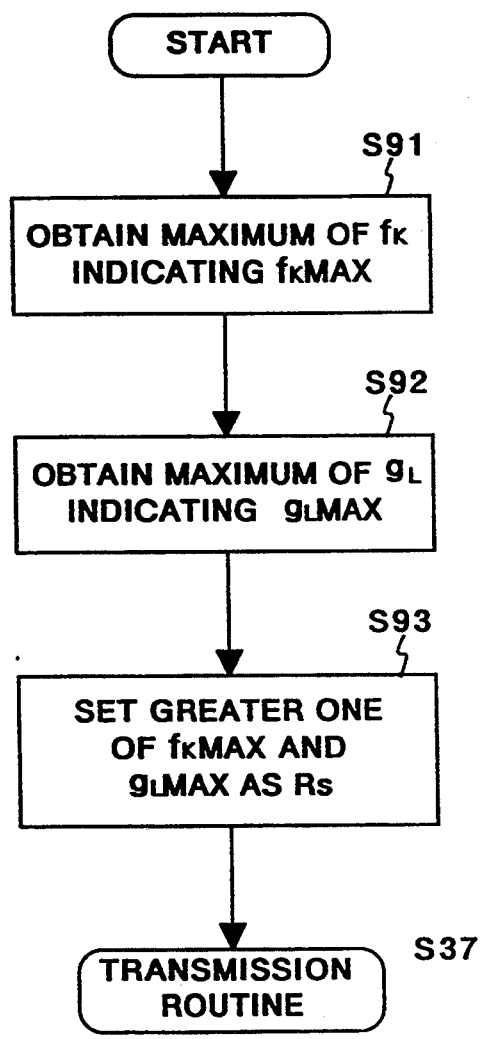
FIG. 6 is a flow chart of the method of determining the final transmission resolution in accordance with a first modification of the first embodiment.

FIG. 6 is a flow chart of a method of determining the final transmission resolution in accordance with the first modification of the first embodiment.

As shown in FIG. 6, a maximum value $f_K$MAX and a maximum value $g_L$MAX are obtained from the resolutions $f_K$ and $g_L$, respectively (step S91, step S92). The greater one of the maximum values $f_K$MAX and $g_L$MAX is determined as final transmission resolution Rs (step S93).

Thus, the final transmission resolution Rs is always selected from the greater one to realize a transmission mode in which high-resolution or high-image-quality transmission is effected with priority.

SECOND MODIFICATION

Figure 7:
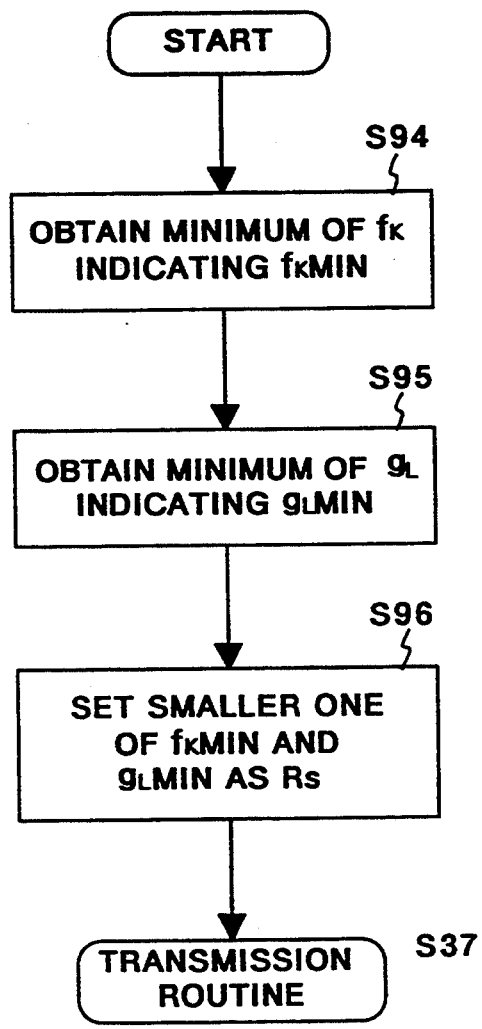
FIG. 7 is a flow chart of the method of determining the final transmission resolution in accordance with a second modification of the first embodiment.

FIG. 7 is a flow chart of a method of determining the final transmission resolution in accordance with the second modification of the first embodiment.

In the second modification, as shown in FIG. 7, a minimum value $f_K$MIN and a minimum value $g_L$NIN are obtained from the resolutions $f_K$ and $g_L$, respectively (step S94, step S95). The smaller one of the maximum values $f_K$MIN and $g_L$MIN is determined as final transmission resolution Rs (step S96).

Thus, the final transmission resolution Rs is always selected from the smaller one to enable lower-resolution or low-communication-charge transmission.

THIRD MODIFICATION

Figure 8:
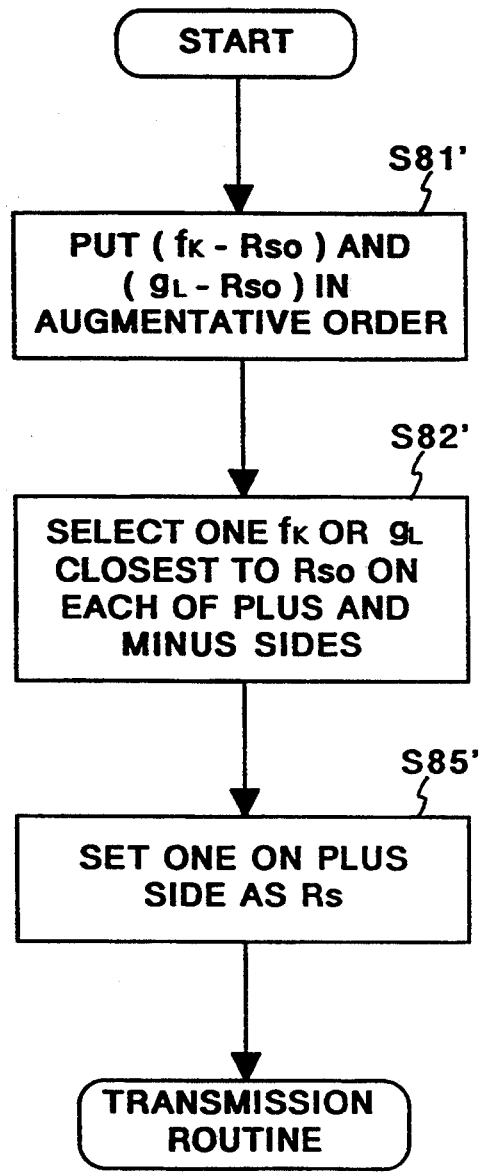
FIG. 8 is a flow chart of the method of determining the final transmission resolution in accordance with a third modification of the first embodiment.

FIG. 8 is a flow chart of a method of determining the final transmission resolution in accordance with the third modification of the first embodiment. Steps S81', S82', and S85' shown in FIG. 8 represent the same processing as steps S81, 82, and 85 shown in FIG. 5.

In accordance with the third modification, one of the resolutions corresponding to the plus one of the minimum differences between the resolution presented from the transmitter for transmission and the resolution at which the receiver can receive, i.e., the higher resolution is compulsorily determined as final transmission resolution Rs. This method is effective at the time of communication with clients who always use high-definition transmitted images.

FOURTH MODIFICATION

Figure 9:
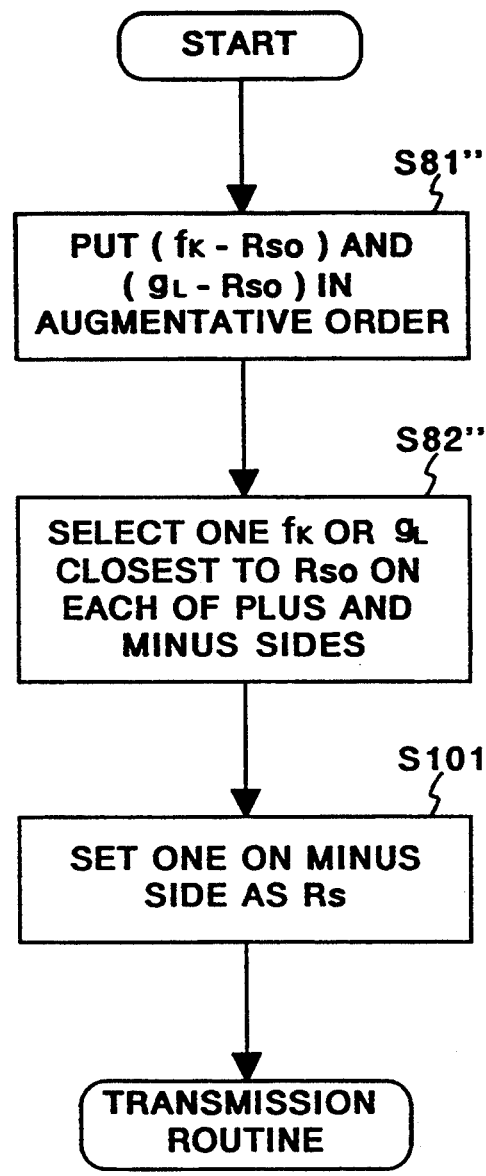
FIG. 9 is a flow chart of the method of determining the final transmission resolution in accordance with a fourth modification of the first embodiment.

FIG. 9 is a flow chart of a method of determining the final transmission resolution in accordance with the fourth modification of the first embodiment. Steps S81" and S82" shown in FIG. 9 represent the same processing as steps S81 and S82 shown in FIG. 5, and step S101 represents a routine for setting one of the resolutions on the minus side as final transmission resolution Rs.

In accordance with the fourth modification, one of the resolutions corresponding to the minus one of the minimum differences between the resolution presented from the transmitter for transmission and the resolution at which the receiver can receive, i.e., the lower resolution is compulsorily determined as final transmission resolution Rs. This method is also most suitable for low-communication-charge transmission.

FIFTH MODIFICATION

FIG. 10 is a flow chart of a method of determining the final transmission resolution in accordance with the fifth modification of the first embodiment.

As shown in FIG. 10, software or hardware switching is first effected to select one of a plurality of final transmission resolution determination methods (step S102). By this switching, the processing of determining the final transmission resolution explained with reference to FIG. 5 is performed (step S104) when switch SW2=1, the processing described with respect to the first modification (FIG. 6) is performed (step S105) switch SW2=2, and the processing described with respect to the second modification (FIG. 7) is performed when SW2=3.

A method of changing over the switch by means of software may be such that a display for indicating the plurality of final transmission resolution determination methods is provided as a touch panel on the operation panel, and that this touch panel is pressed by the operator to change over the switch. A method of changing over the switch by means of hardware may be such that a switch for changing over the final transmission resolution determination methods is provided in the operation panel or in a place such that no operational problem is encountered.

In accordance with the fifth modification, as described above, the methods of determining the final transmission resolution Rs can be selected according to various purposes by switching performed by the operator or a certain factor factors (e.g., time). That is, at the time of multicast transmission, transmission resolutions according to the optimum combinations of transmitting and receiving resolutions satisfying the transmitter operator's intention can be obtained no matter what the receiving resolutions of the receiving apparatuses.

SECOND EMBODIMENT

FIG. 11 is a flow chart of a pre-procedure routine in accordance with the second embodiment. This routine represents another example of the processing of step 36 (pre-procedure routine) of FIG. 3 described above with respect to the first embodiment. Specifically, it differs from the pre-procedure routine (FIG. 4) of the first embodiment in the hardware or software means for changing over the final transmission resolution. Except for this, the second embodiment is the same as the first embodiment, and the description for the construction and other routines will not be repeated.

In FIG. 11, the same routine as those shown in FIG. 4 are indicated by corresponding step numbers with primes ('). Other different routines will be described below. In step S55', the nominal transmission resolution Rsn of the transmitter and the nominal receiving resolution Rrn of the receiver are compared. If Rsn=300, 200 (ppi); and Rrn=400, 200 (ppi) as in the case of the first embodiment, a match occurs with respect to 200 ppi. In discrimination routine of the step 55', therefore, the result of discrimination is "matching", i.e., YES, and the process proceeds to steps S72. If there is no matching resolution, it is determined that "mismatching (error)" has occurred and the process proceeds to step S61' to perform error processing.

In step S72, according to the setting of a switch constituted by means of software or hardware, the process proceeds to step S56' which is the same as step 56 described with respect to the first embodiment or to step S73 newly provided. When the switch SW1=ON, the process proceeds to step S56' to perform processing of the same pre-procedure routine as that shown in FIG. 4. When SW=OFF, the process proceeds to step S73 to immediately determine final transmission resolution Rs without checking non-nominal transmission resolution Rsm.

The method of determining the final transmission resolution Rs in this embodiment may be equal to one of those of the first embodiment and first to fifth modifications.

In the second embodiment, as described above, switch SW1 is provided to enable the apparatus to be easily adapted for a kind of use such that the operator do not want to use the non-nominal transmission resolution Rsm. In some countries, transmission at a resolution higher than the actual reading resolution is unauthorized. In such a case, the use of switch SW1 is effective.

THIRD EMBODIMENT

Figure 12:
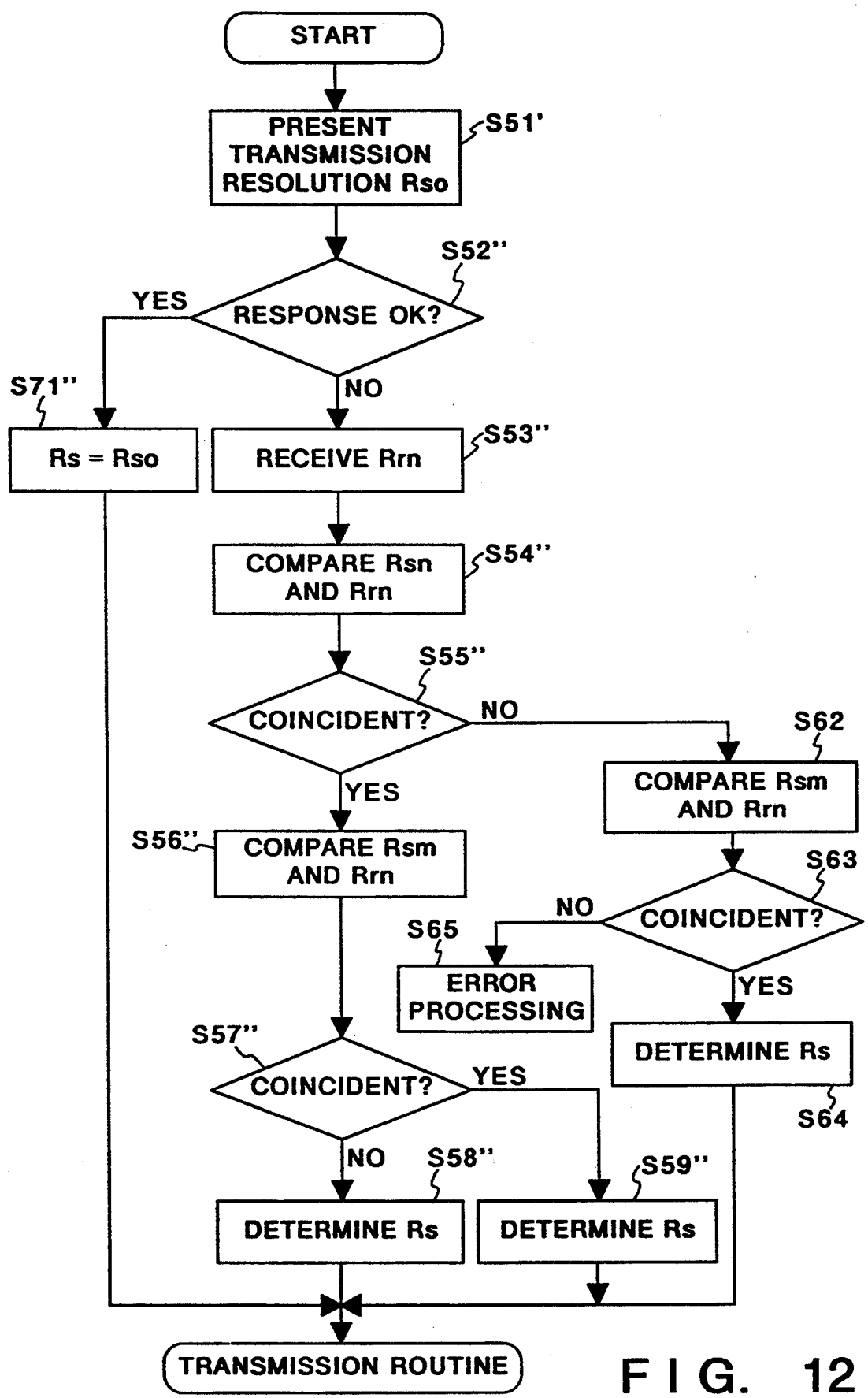
FIG. 12 is a flow chart of a pre-procedure routine of a third embodiment.

FIG. 12 is a flow chart of a pre-procedure routine in accordance with the third embodiment. This routine represents a further example of the processing of step S36 (pre-procedure routine) of FIG. 3 described above with respect to the first embodiment. Specifically, it differs from the pre-procedure routine (FIG. 4) of the first embodiment in that when the result of the discrimination routine of step S55 is NO, error processing is not performed immediately. Except for this, the third embodiment is the same as the first embodiment, and the description for the construction and other routines will not be repeated.

In FIG. 12, the same routine as those shown in FIG. 4 are indicated by corresponding step numbers with double primes ("). Other different routines will be described below. In step S55", the nominal transmission resolution Rsn of the transmitter and the nominal receiving resolution Rrn of the receiver are compared. If matching is confirmed in this step, i.e., the result of discrimination of the discrimination routine of step S55" is YES, the process proceeds to step S56". If there is no matching resolution, it is determined that "mismatching (error)" has occurred and the process proceeds to step S62 in which the non-nominal transmission resolution Rsm and the nominal receiving resolution Rrn are compared. If there is no matching resolution in these resolutions, the process proceeds to an error processing routine in steps 65. If there is a matching resolution, the process proceeds to step S64 to determine final transmission resolution Rs.

The method of determining the final transmission resolution Rs in this embodiment may be equal to one of those of the first embodiment and first to fifth modifications.

In the third embodiment, as described above, communication with a non-standard type receiver not provided with the standard resolution is possible provided that the image encoding/decoding systems match each other, even when it is determined in step S54 that there is no matching resolution.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A facsimile apparatus having a plurality of different nominal transmission resolutions and a plurality of different non-nominal transmission resolutions, said facsimile apparatus comprising:
   memory means for storing image data read from an original to be transmitted;
   first collation means for collating said nominal transmission resolutions with a plurality of different nominal transmission destination resolutions;
   second collation means for collating said non-nominal transmission resolutions with said nominal transmission destination resolutions, said second collation means executing the collation provided that a match occurs in the collation performed by said first collation means;
   conversion means for converting the resolution of the image data stored by said memory means into one of the nominal transmission resolutions found as a matching resolution by said first collation means or said second collation means; and
   transmission means for transmitting the image data of the converted resolution.

2. A facsimile apparatus according to claim 1, wherein said conversion means includes selection means for manually selecting one of said first and second collation means.

3. A facsimile apparatus according to claim 1, wherein said memory means stores the image data in a nominal resolution.

4. A facsimile apparatus having a plurality of different nominal transmission resolutions and a plurality of different non-nominal transmission resolutions, said facsimile apparatus comprising:
   generation means for generating image data to be transmitted;
   first collation means for collating the nominal transmission resolutions with a plurality of different nominal transmission destination resolutions;
   second collation means for collating the non-nominal transmission resolutions with the nominal transmission destination resolutions;
   conversion means for converting the resolution of the image data generated by said generation means into one of the nominal transmission resolutions found as a matching resolution by said first collation means or said second collation means; and
   transmission means for transmitting the image data having the converted resolution.

5. A facsimile apparatus according to claim 4, wherein said conversion means includes selection means for manually selecting one of said first and second collation means.

6. A facsimile apparatus according to claim 4, wherein said generation means includes reading means for reading an original image.

7. A facsimile apparatus according to claim 4, wherein said second compare means performs the collation provided that a match occurs in the collation performed by said first collation means.

8. A facsimile apparatus according to claim 4, wherein said second collation means performs the collation provided that an match occurs in the collation performed by said first collation means.

9. A method of determining a transmission resolution in a facsimile communication comprising:
   detecting a plurality of nominal resolutions of a facsimile apparatus on the receiving side in accordance with a predetermined transmission procedure;
   comparing the plurality of nominal resolutions detected in said detecting step with a plurality of non-nominal resolutions of a facsimile apparatus on the transmitting side; and
   determining the transmission resolution from the plurality of non-nominal resolutions in accordance with results obtained in said comparing step.

10. The method according to claim 9, further comprising the step of generating image data to be transmitted.

11. The method according to claim 10, further comprising the step of converting the resolution of the image data into the determined resolution in said determining step.

12. The method according to claim 11, further comprising the step of transmitting the resolution-converted image data.

13. The method according to claim 10, wherein said generating step further includes the step of reading an original image.

14. The method according to claim 9, further comprising a pre-comparison step of comparing the plurality of nominal resolutions detected in said detecting step with a plurality of nominal resolutions of the facsimile apparatus on the transmitting side, wherein said pre-comparison step is executed before said comparing step.

15. The method according to claim 14, wherein, if one of the plurality of nominal resolutions detected in said detecting step coincides with any one of the plurality of nominal resolutions of the facsimile apparatus on the transmitting side, based on results of said pre-comparison step, said comparing step is executed.

16. The method according to claim 14, wherein, if none of the plurality of nominal resolutions detected in said detecting step coincides with any one of the plurality of nominal resolutions of the facsimile apparatus on the transmitting side, based on results of said pre-comparison step, said comparing step is executed.

17. A method of determining a transmission resolution in a facsimile communication comprising:
   detecting a plurality of nominal resolutions of a facsimile apparatus on the receiving side in accordance with a predetermined transmission procedure;
   comparing the plurality of nominal resolutions detected in said detecting step with a plurality of nominal resolutions of a facsimile apparatus on the transmitting side; and
   determining the transmission resolution from resolutions excluding the plurality of nominal resolutions of the facsimile apparatus on the transmitting side in accordance with results obtained in said comparing step.

18. The method according to claim 17, further comprising the step of generating image data to be transmitted.

19. The method according to claim 18, wherein said generating step further includes the step of reading an original image.

20. The method according to claim 18, further comprising a first conversion step of converting the resolution of the image data into the resolution determined in said determining step.

21. The method according to claim 20, further comprising a second conversion step of converting the resolution of the image data into any desired resolution excluding the plurality of nominal resolutions of the facsimile apparatus on the transmitting side.

22. The method according to claim 20, further comprising the step of transmitting the resolution-converted image data.

* * * * *

UNITED STATES PATENT AND TRADEMARK OFFICE
CERTIFICATE OF CORRECTION

PATENT NO. : 5,341,221
DATED : August 23, 1994
INVENTOR(S) : HIROYUKI MIKADA

It is certified that error appears in the above-identified patent and that said Letters Patent is hereby corrected as shown below:

COLUMN 1

Line 25, "inconformity" should read --nonconformity--.
Line 26, "transmiting" should read --transmitting--.
Line 33, "ne/mm" should read --nes/mm--.

COLUMN 2

Line 3, "case," should read --cases,--.
Line 30, "to" (second occurrence) should be deleted.

COLUMN 4

Line 30, "Controls" should read --Control--.

COLUMN 5

Line 24, "sub scanning" should read --sub-scanning--.
Line 62, "pseudo half tone" should read --pseudo-half-tone--.

COLUMN 6

Line 62, "FIG. 1." should read --FIG. 3.--.

COLUMN 7

Line 2, "AS" should read --As--.
Line 42, "(step 36)." should read --(step S36).--.
Line 43, "date" should read --data--.
Line 49, "(step 36)" should read --(step S36)--.
Line 56, "date" should read --data--.

UNITED STATES PATENT AND TRADEMARK OFFICE
CERTIFICATE OF CORRECTION

PATENT NO. : 5,341,221
DATED : August 23, 1994
INVENTOR(S) : HIROYUKI MIKADA

It is certified that error appears in the above-identified patent and that said Letters Patent is hereby corrected as shown below:

COLUMN 8

Line 13, "3300 ppi" should read --300 ppi--.

COLUMN 9

Line 39, "case." should read --cases.--.
Line 45, "$f_k$" should read --$f_K$--.
Line 58, "($f_K$-RSo) and ($g_L$-RSO)" should read --($f_K$-Rso) and ($g_L$-Rso)--.

COLUMN 10

Line 14, "other." should read --other).--.
Line 31, "an" should read --and--.
Line 39, "risms" should read --rithms--.
Line 64, "$g_L$NIN" should read --$g_L$MIN--.

COLUMN 11

Line 10, "82, and 85" should read --S82, and S85--.
Line 50, "switch" should read --when switch--.
Line 68, "factor factors" should read --factor or factors--.

COLUMN 12

Line 10, "step 36" should read --step S36--.
Line 27, "step 55'," should read --step S55',--.
Line 29, "steps S72." should read --step S72.--.
Line 35, "step 56" should read --step S56--.
Line 40, "SW=OFF," should read --SW1=OFF,--.
Line 51, "do" should read --does--.

UNITED STATES PATENT AND TRADEMARK OFFICE
CERTIFICATE OF CORRECTION

PATENT NO. : 5,341,221

DATED : August 23, 1994

INVENTOR(S) : HIROYUKI MIKADA

It is certified that error appears in the above-identified patent and that said Letters Patent is hereby corrected as shown below:

<u>COLUMN 13</u>

Line 1, "routine" should read --routines--.
   Line 16, "steps 65." should read --step S65.--.

<u>COLUMN 14</u>

Line 26, "compare" should read --collation--.
   Line 31, "match" should read --unmatch--.

Signed and Sealed this

Seventh Day of February, 1995

Attest:

BRUCE LEHMAN

*Attesting Officer*     *Commissioner of Patents and Trademarks*